United States Patent
Yarlagadda et al.

(10) Patent No.: US 12,259,887 B2
(45) Date of Patent: Mar. 25, 2025

(54) SYSTEMS AND METHODS FOR NORMALIZING DATA HAVING DISPARATE FORMATS

(71) Applicant: JPMORGAN CHASE BANK, N.A., New York, NY (US)

(72) Inventors: Sitaram Yarlagadda, Plano, TX (US); Ananth Hegde, Frisco, TX (US); Kevin Hathaway, Glasgow (GB); Steven Lau, New York, NY (US); Srijay Gupta, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/158,789

(22) Filed: Jan. 24, 2023

(65) Prior Publication Data

US 2024/0248898 A1    Jul. 25, 2024

(51) Int. Cl.
*G06F 16/2455*    (2019.01)
*G06F 16/25*    (2019.01)
*G06F 16/28*    (2019.01)

(52) U.S. Cl.
CPC ........ *G06F 16/2455* (2019.01); *G06F 16/258* (2019.01); *G06F 16/283* (2019.01)

(58) Field of Classification Search
CPC ... G06F 16/2455; G06F 16/258; G06F 16/283
See application file for complete search history.

(56) References Cited

U.S. PATENT DOCUMENTS

| | | | |
|---|---|---|---|
| 11,509,709 B1* | 11/2022 | Basak | H04L 9/3297 |
| 2009/0327257 A1* | 12/2009 | Abouzeid | G06F 16/2428 |
| 2019/0121807 A1* | 4/2019 | Boutros | G06F 16/9024 |

* cited by examiner

*Primary Examiner* — Cheyne D Ly
(74) *Attorney, Agent, or Firm* — GREENBERG TRAURIG LLP (57) ABSTRACT

In some aspects, the techniques described herein relate to a method including: executing a first query, at a predefined time interval, against a target datastore for insight records related to an entity identifier; storing results of the first query as a record set, wherein the record set includes one or more existing insight records, and wherein each existing insight record includes connection information for connecting to a corresponding insight datastore; executing insight retrieval logic for each insight record in the record set, wherein the insight retrieval logic executes a second query against the corresponding insight datastore and retrieves a new insight value from the corresponding insight datastore; persisting the new insight value in a new insight record in the target datastore; and sending the new insight record as a communication to a recipient.

19 Claims, 5 Drawing Sheets

SYSTEMS AND METHODS FOR NORMALIZING DATA HAVING DISPARATE FORMATS

BACKGROUND

1. Field of the Invention

Aspects generally relate to systems and methods for normalizing data having disparate formats.

2. Description of the Related Art

In step with the availability of ubiquitous data from countless disparate data sources comes the challenge of leveraging the data to produce meaningful insights therefrom. One such challenge is formatting the data in a standardized and uniform way, so that it can be consumed in a predictable way. Conventionally, a vast amount of development resources has been assigned to normalize disparate data models through pre-processing procedures designed and implemented in a bespoke manner. However, the prolific generation and publishing of ever more data through disparate data models, from both internal and external sources, makes ad-hoc development solutions inefficient and unsustainable.

SUMMARY

In some aspects, the techniques described herein relate to a method, including: executing a first query, at a predefined time interval, against a target datastore for insight records related to an entity identifier; storing results of the first query as a record set, wherein the record set includes one or more existing insight records, and wherein each existing insight record includes connection information for connecting to a corresponding insight datastore; executing insight retrieval logic for each insight record in the record set, wherein the insight retrieval logic executes a second query against the corresponding insight datastore and retrieves a new insight value from the corresponding insight datastore; persisting the new insight value in a new insight record in the target datastore; and sending the new insight record as a communication to a recipient.

In some aspects, the techniques described herein relate to a method, including: persisting the new insight record with a new time stamp.

In some aspects, the techniques described herein relate to a method, wherein the one or more existing insight records each include a corresponding time stamp.

In some aspects, the techniques described herein relate to a method, wherein the new insight value was added to the insight datastore after the corresponding time stamp.

In some aspects, the techniques described herein relate to a method, including: determining the new insight value was added to the insight datastore based on existing insight values an existing insight record, the new insight record, the corresponding time stamp, and the new time stamp.

In some aspects, the techniques described herein relate to a method, including: providing a user interface for configuration and addition of an initial insight record to the target datastore.

In some aspects, the techniques described herein relate to a method, wherein the user interface receives the entity identifier, and the connection information.

In some aspects, the techniques described herein relate to a method, wherein the recipient is a computer application.

In some aspects, the techniques described herein relate to a system including one or more computers including a processor, wherein the one or more computers are configured to: execute a first query, at a predefined time interval, against a target datastore for insight records related to an entity identifier; store results of the first query as a record set, wherein the record set includes one or more existing insight records, and wherein each existing insight record includes connection information for connecting to a corresponding insight datastore; execute insight retrieval logic for each insight record in the record set, wherein the insight retrieval logic executes a second query against the corresponding insight datastore and retrieves a new insight value from the corresponding insight datastore; persist the new insight value in a new insight record in the target datastore; and send the new insight record as a communication to a recipient.

In some aspects, the techniques described herein relate to a system, wherein the one or more computers are configured to: persist the new insight record with a new time stamp.

In some aspects, the techniques described herein relate to a system, wherein the one or more existing insight records each include a corresponding time stamp.

In some aspects, the techniques described herein relate to a system, wherein the new insight value was added to the insight datastore after the corresponding time stamp.

In some aspects, the techniques described herein relate to a system, wherein the one or more computers are configured to: determine the new insight value was added to the insight datastore based on existing insight values an existing insight record, the new insight record, the corresponding time stamp, and the new time stamp.

In some aspects, the techniques described herein relate to a system, wherein the one or more computers are configured to: provide a user interface for configuration and addition of an initial insight record to the target datastore.

In some aspects, the techniques described herein relate to a system, wherein the user interface receives the entity identifier, and the connection information.

In some aspects, the techniques described herein relate to a system, wherein the recipient is a computer application.

In some aspects, the techniques described herein relate to a non-transitory computer readable storage medium including instructions stored thereon, which instructions, when read and executed by one or more computer processors, cause the one or more computer processors to perform steps including: executing a first query, at a predefined time interval, against a target datastore for insight records related to an entity identifier; storing results of the first query as a record set, wherein the record set includes one or more existing insight records, and wherein each existing insight record includes connection information for connecting to a corresponding insight datastore; executing insight retrieval logic for each insight record in the record set, wherein the insight retrieval logic executes a second query against the corresponding insight datastore and retrieves a new insight value from the corresponding insight datastore; persisting the new insight value in a new insight record in the target datastore; and sending the new insight record as a communication to a recipient.

In some aspects, the techniques described herein relate to a non-transitory computer readable storage medium, including: persisting the new insight record with a new time stamp.

In some aspects, the techniques described herein relate to a non-transitory computer readable storage medium, wherein: the one or more existing insight records each include a corresponding time stamp; and the new insight value was added to the insight datastore after the corresponding time stamp.

In some aspects, the techniques described herein relate to a non-transitory computer readable storage medium, including: determining the new insight value was added to the insight datastore based on existing insight values an existing insight record, the new insight record, the corresponding time stamp, and the new time stamp; and providing a user interface for configuration and addition of an initial insight record to the target datastore; and wherein the user interface receives the entity identifier, and the connection information, and wherein the recipient is a computer application.

DETAILED DESCRIPTION

Aspects are generally directed to normalizing disparate data formats. In aspects, insight data from disparate data sources and having disparate formats can be normalized in a uniform data model.

In accordance with aspects, systems and methods enable the generation, standardization, and distribution of timely, meaningful, actionable, and personalized insights to business teams. Aspects may consume data from heterogeneous data sources, including on-premises or cloud-based sources across a technology infrastructure in a scalable fashion, conform the data to a normalized structure, select insights most relevant to a given user or group of users, and deliver the insights to downstream applications via API-based or streaming patterns, delimited file formats, compressed file formats (e.g., parquet, xml etc.), mini-batch streams, batch streams, etc.

Aspects disclosed herein reduce the need for point-to-point integration between applications and eliminate unnecessary data movement between cloud, on-premises, and other systems. The disclosed systems and methods produce technical enhancements through a reduction in hardware and software overhead and improved data processing efficiency by providing a single, predictable data model. Data security is also enhanced through the reduced movement and processing of data, thereby reducing accessible points of data interception by malicious actors. Additional technical enhancements include improved data transparency and data governance, and data monitoring capabilities due to the predictability of a uniform data model. Aspects further empower client-facing business teams with near real-time information needed to best serve their clients and seize opportunities to convert prospects.

In accordance with aspects, systems and methods may facilitate the generation of multi-modal insights from disparate data sources and provide the multi-modal insights through a single channel and in a standardized format. Aspects may eliminate the need for organizations to assign development resources for generation of bespoke preprocessing routines for each data model in a pool of data sources (i.e., federated data sources). Aspects may facilitate ingestion of data from any data model, whether structured, unstructured, API-sourced, streaming, batch and mini-batches etc., as inputs to the disclosed systems and methods. The input data can be normalized, and insights can be extracted from the federated data sources. Aspects may include a rules-based trigger that, when executed, detects differences in the input data model and determines necessary changes to the input data model in order to normalize the data for inclusion in a standardized and uniform data model/format. Aspects may be constructed as a stateless, microservices architecture.

Logic may be written in a high-level coding language that may take the form of pseudo code syntax or a business logic syntax. End users may use graphical system interfaces and to build logic, including triggers, that retrieve insight values from various entities on a recurring basis. Triggers may include logic to push insights to various channels via various protocols. Exemplary channels include pushing insights out over APIs, data streams, RSS feeds, etc. (to, e.g., mobile platforms or social media interfaces), writing to datastores for later querying, and providing to data lakes that, in turn, may expose the insights to ML models and produce predictions, relationships, graphs, etc.

In accordance with aspects, insights may include any topic of interest to an end user that may be retrieved from an electronic data source. An end user may find a particular insight of interest because the insight may provide information that is valuable to the end user or to a business client of the end user. Insight data sources may be internal or external to an organization with which an end user is affiliated. Exemplary insights include growth signals (e.g., material changes to account balances or inflows); investments (e.g., VC/PE fundings or funding opportunities); management changes (e.g., new CEO or new CFO); mergers and acquisition information (e.g., news on mergers or acquisitions); product recommendations (e.g., suggestions of opportunities to deepen client relationships), etc.

In accordance with aspects, a uniform data model may store insight values and metadata related to insights. An exemplary uniform data model may include fields for storing an insight name, an insight value, an insight type, an insight data type (e.g., "string" "character," "integer," etc.), an insight group name, insight code, insight configuration settings, an insight version number, a query frequency (e.g., how often a source is queried for a given insight), an insight source name, an insight source type, an insight source connection string, user actions on insights, insight time to live values, an insight visibility, entitlements information and/or an insight source location. A uniform data model may also have a last-updated field that stores a timestamp. The stored timestamp may indicate the last time that insight source data was polled, modified, and/or created (e.g., using insight retrieval logic) to determine whether new insights have been added to the insight data source.

An insight name may be a descriptive string that identifies a retrieved/determined insight value. For instance, an insight name may be, "year-over-year account value growth," while a corresponding insight data type may be "integer," "decimal," or "string," and an insight value may be "150000," or "150.000,00," or "$150.000.00."

An insight type may store one of several expected data formats in which an insight and related data may be received. For instance, one insight type may be labelled as "CODE" and may represent data received from a structured query language (SQL) query string, from some other type of coded query, or from any programming language code depicting the insight logic. A CODE insight type may also store an SQL statement or other code required to retrieve the insight-related data. Another insight type may be "POST" and may indicate that insight data/values will be posted from an API. A POST insight type may include an API universal resource locator (URL), or other command required to retrieve the insight-related data. Another exemplary insight type may be labeled as "BULK" and may indicate that insight-related data will be received in a bulk format (e.g., an unstructured format, a flat-file format, etc.). A BULK insight type may include commands, parameters, or source methodologies (e.g., Kafka® broker, secure file transfer protocol (SFTP) site, or any applicable messaging queue logic), required to retrieve bulk insight data. Other insight types may be incorporated based on the insight data source, as is necessary or desired.

An insight group value may indicate a high-level group or other organizational unit that an insight belongs to. Insight groups may be used to sort similar insights for reporting and/or alert communications.

Insight configuration settings may include a configuration file and/or stored logic/stored procedures that executes the insight retrieval, storage, and/or alert communication procedures. Because insights may be stored as immutable, an insight version number may be included in a unified data model to identify a version of a given insight. An insight source type may identify a type of the insight source system. For example, insights source system types may be file systems, relational database management systems (RDBMS), data lakes (such as Hadoop® systems), data warehouses, etc. An insight source connection string may include connection parameters and/or commands required to connect to a given insight source type. For instance, an insight source type may include connection strings, URLs, usernames, passwords, etc. An insight source location may indicate a location of insight-related data on a source system type. For instance, given a data lake as an insight source type, a corresponding insight source location may specify the location of the desired insight data in an appropriate format (e.g., "/sys1/loc/loc1/loc2/"). Likewise, given a directory structure as an insight source type, a corresponding insight source location may include a drive and directory tree location (e.g., "c:\dir1\dir2\dir3").

Insights may be related to a source entity. A uniform data model may further include and facilitate storage of data/metadata related to a source entity that may be a provider of an insight. In accordance with aspects, target storage system details and metadata (i.e., local systems/datastores for storing retrieved insight data) may be stored with relations to a source entity in a uniform data model. An exemplary uniform data model may include fields such as "entity name," "entity key name," "target system name," "target system type," "target system connection string," "source system name," "source system type," "source connection string," "source location," and "target system location."

An entity name field may be configured to indicate and store the descriptive name of an entity on which an insight is received. For any one entity name, there may be many insights provided by, and related to, the entity. An entity key name may indicate and store the name of an entity key on which insight alert communications are generated. An entity key name may also act as a lookup key (e.g., a primary of foreign key). A target system name may indicate a name or category of target system where insight related data is stored after retrieval. An target system type may identify a type of storage system for received insight-related data. For example, target systems may be file systems, relational database management systems (RDBMS), data lakes (such as Hadoop® systems), data warehouse, web applications, streaming sets, etc. A target system connection string may include connection parameters and/or commands required to connect to a given target system type. A target system location may indicate a location for storage of retrieved insight-related data on a target system. For instance, given a data lake as a target system type, a corresponding target system location may specify the storage location of the retrieved insight data in an appropriate format (e.g., "/sys1/loc/loc1/loc2/," or "c: \dir1\dir2\dir3").

In accordance with aspects, a target datastore for storing retrieved source entity data and insight-related data may any suitable datastore. In some aspects, a target datastore is a relational database. In a relational database, source entity data may be stored in a first table, and insight-related data may be stored in a second table. The first and second tables may be related with a primary/foreign key relationship. That is, the second table may include a foreign key value (e.g., an entity identification value, such as the entity key name) that references an the entity key name value stored in the first table. Such a relationship model allows for a one-to-many relationship with respect to entities and insights, respectively.

In some aspects, the datastore may be an enterprise data warehouse that aggregates data from different entity sources and makes the retrieved data available for data analysis, data mining, and artificial intelligence (AI) and machine learning (ML) operations. A data warehouse may include a server that performs extract, transform, and load (ETL), or extract, load, and transform (ELT) operations on data received from multiple entity sources. In accordance with aspects, preparatory operations such as cleaning, standardizing, normalizing, and/or other data preprocessing operations can be avoided due to the uniform data model.

In some aspects, multiple datastores may be used. For instance, a data warehouse or insight retrieval logic may persist retrieved insight-related data to a relational database, an online analytical processing (OLAP) database, or another appropriate type of database/datastore. A datastore may also include a user interface, reporting tools, and/or published private or public application programming interfaces (APIs) for programmatic submission and retrieval of data stored therein.

Figure 1:
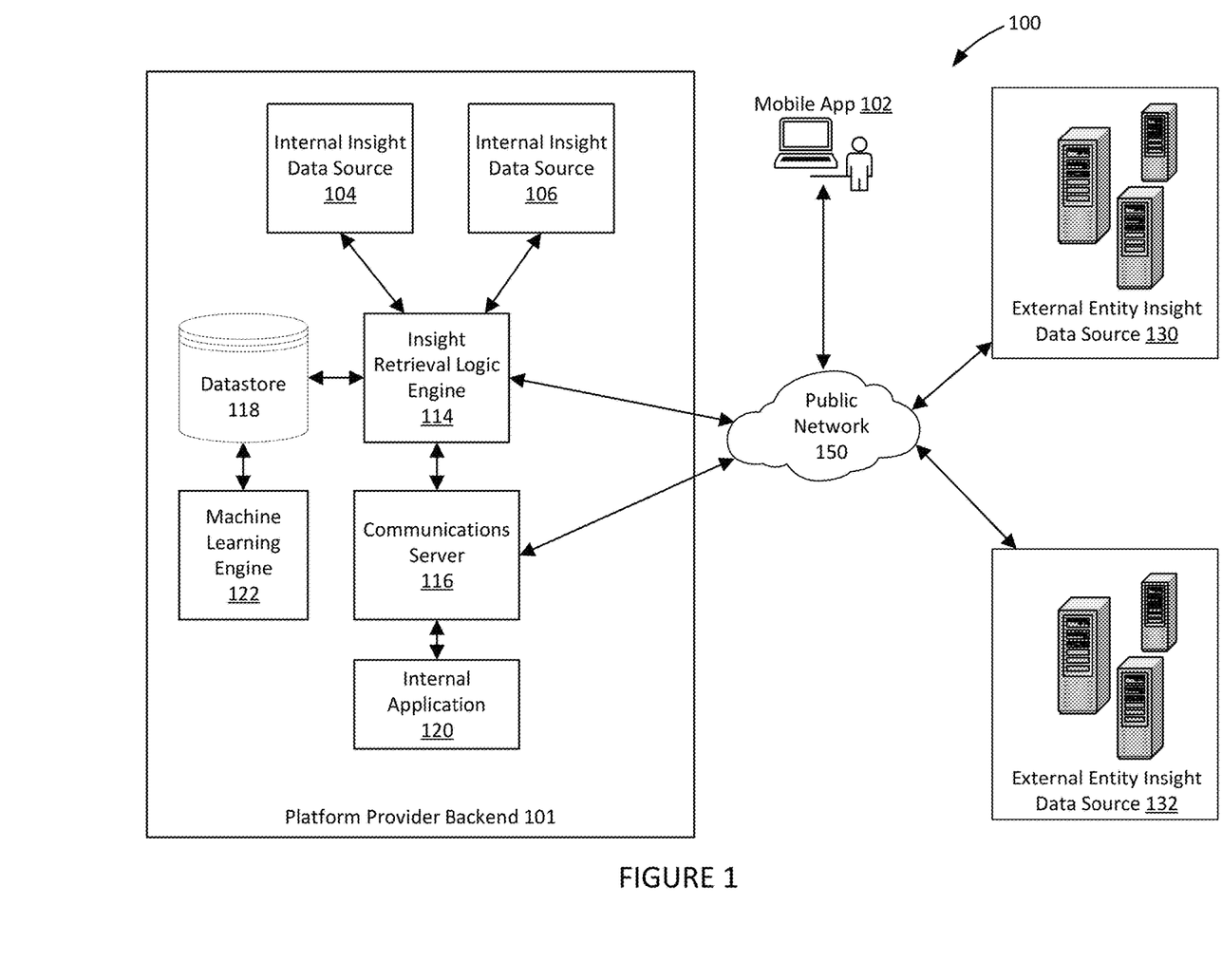
FIG. 1 is a block diagram of a system for normalizing insight data having disparate formats in a uniform data model, in accordance with aspects.

FIG. 1 is a block diagram of a system for normalizing insight data having disparate formats in a uniform data model, in accordance with aspects. System 100 includes platform provider backend 101, which includes insight retrieval logic engine 114, datastore 118, machine learning engine 122, internal insight data source 104, internal insight data source 106, communications server 116 and internal application 120. Also shown in FIG. 1 is external entity insight data source 130, external entity insight data source 132, mobile app 102, and public network 150.

In accordance with aspects, platform provider backend 101 is the backend technology infrastructure of an organizational provider of the systems and methods described herein. Platform provider backend 101 includes servers, computers, software applications, computer network mediums, and computer networking hardware and software for providing electronic services based on computer software applications executing on requisite hardware. Exemplary hardware and software include webservers, application servers, communication servers such as email servers and SMS servers, network routers, switches and firewalls, custom-developed software applications including hardware to execute them on, etc.

The software and hardware components of system 100 may each be communicatively coupled to each other and to public network 150 with appropriate hardware and software. For instance, hardware components can include a wired or wireless network interface card (NIC) that interfaces with both a private network of platform provider backend 101 and with public network 150, and that is configured with appropriate communication protocols. Platform provider backend 101 can include hardware (NICs, switches, routers, etc.) configured with appropriate protocols for providing intercommunication with the internal system components of platform provider backend 101 and with external system components via public network 150.

Datastore 118 is a target datastore as discussed herein. Datastore 118 may be any suitable datastore. Exemplary datastores include relation databases, directory structures, data warehouses, data lakes, flat-file architectures, etc. Datastore 118 may include appropriate software such as a database engine or a data warehouse or data lake engine executing on appropriate server hardware. Although datastore 118 is shown as internal to platform provider backend 101, it is contemplated that datastore 118 may be a cloud-based datastore that is provided by a commercial third-party off-premises storage provider to which the platform provider subscribes to. Alternatively, datastore 118 may be remote cloud-based storage hosted by the platform provider.

Insight retrieval logic engine 114 is a software module including insight retrieval logic and query execution logic as discussed herein. Insight retrieval logic engine 114 is configured to execute on appropriate server hardware. Insight retrieval logic engine 114 is in operative communication with datastore 118 and may query and write to datastore 118 as described herein.

Insight retrieval logic engine 114 is in operative communication with internal insight data source 104 and internal insight data source 106. Internal insight data source 104 and internal insight data source 106 are insight data sources that are internal to platform provider backend 101. Internal insight data source 104 and internal insight data source 106 may be any system of record, datastore, etc., that insight-related data may be retrieved from. External entity insight data source 130 and external entity insight data source 132, likewise, are any system of record, datastore, etc., that insight data may be retrieved from. External entity insight data source 130 and external entity insight data source 132 are external to platform provider backend 101. Insight retrieval logic engine 114 may access external entity insight data source 130 and external entity insight data source 132 via public network 150 as described herein.

Communications server 116 is in operative communication with internal application 120 and with mobile app 102 (via public network 150) and may be configured to send insight alerts and insight reporting to communications server 116 and mobile app 102 as described herein. Exemplary configurations of communications server 116 may be as an email server, an SMS server, and API server, a distributed event streaming platform server, etc.

Machine learning engine 122 may include machine learning (ML) models that may be exposed to insight related information stored in datastore 118, and may make predictions with respect to what insights may be relevant to which users and/or applications. Machine learning engine 122 may include or or more ML algorithms/models, such as a decision trees model, a neural networks model, a graph neural networks model, etc. Machine learning engine 122 may include personalization logic that may select the insights that would be most relevant to a given user (or user group) based on training of include ML models from prior explicit user feedback, rules-based logic, or collaborative-filtering based approaches.

In accordance with aspects, insight-related information may be queried, retrieved, and stored in a suitable target datastore/data storage system configured with a uniform data model. The retrieved insight-related data can be parsed, and for any new insights found in the retrieved data, an insight alert communication can be generated and sent to a subscribing user.

Insight data source systems may be queried on a periodic basis, which period may be specified by a user. For instance, query execution logic may be scheduled to run monthly, weekly, daily, etc. Query execution logic may begin by connecting to a datastore and may execute a query based on an entity name. The query execution logic may execute a record set query that specifies an entity name, an insight type, and an insight version. The query may request the maximum insight version from the datastore, e.g., using a "MAX" function applied to an insight version number parameter. An exemplary record set query may be "SELECT*FROM [datastore] WHERE [entity name or entity key name]=[a specified entity] AND [insight version number]=MAX(insight version number) AND [insight type] =[a specified insight type]. A record set query may return all fields for all insight records related to the specified entity name or entity key name as a record set.

For each entity name and/or entity key name specified in the record set query, one or many insights may be returned based on the one-to-many relationship between entities and insights in the uniform data model. The record set returned from the record set query may be saved so that it may be used in further processing steps. Insight retrieval logic may use the record set to check for updated insights at an entity data source and/or insight data source.

In accordance with aspects, insight retrieval logic may determine a number of insights returned in a record set and execute further logic to retrieve updated insight-related information from a data source of a related entity. For instance, insight retrieval logic may use related fields returned with each insight record of the record set. Exemplary fields that may be used in insight retrieval logic may include entity name, insight name, insight code, insight configuration settings, insight source connection string, and insight source location.

Insight retrieval logic may provide a loop for each insight returned in the record set. Insight retrieval logic may, for each insight in a record set, use the corresponding insight connection string to connect to the corresponding entity's data source. For each insight record in a record set, insight retrieval logic may use the corresponding insight configuration settings to prepare insight run configurations on the insight data source. For each insight record in a record set, insight retrieval logic may use the corresponding insight type and insight source location to in retrieving insight-related information from the entity's data source.

In accordance with aspects, the results from each iteration of insight retrieval logic may be written, either temporarily or persistently, to a memory. Insight retrieval logic may merge each insight produced for a given insight name into a temporary table and may update a last-updated field with a timestamp that indicates the last execution of insight retrieval logic.

For each iteration of the insight retrieval logic, the retrieved insight-related data may be written to a datastore using the uniform data model. For instance, a new record may be written including any new insight values, a new insight version, and an updated value in the last-updated field that reflects the most recent execution of insight retrieval logic. Similar writes to the datastore may be executed for each insight name or insight identifier in a record set.

In accordance with aspects, insight retrieval logic may determine differences in insight values based on a most recent execution of the insight retrieval logic and a previous execution of the insight retrieval logic and may alert an end user of additional insight values that have been retrieved since the previous execution of the insight retrieval logic. Insight retrieval logic may include a query of the datastore that determines the difference in insight values related to different insight values having different timestamps and/or different versions. Upon a determination that new insight values have been retrieved, the new values may be sent to a communications server and may be formatted and sent to a user through suitable channels.

A communications server may send insight values to an end user via any suitable communication channel Exemplary communication channels include short message service (SMS) messaging, email, in-band channels of applications or mobile applications (e.g., via push notifications, pop-up messages, or in-application messaging), VOIP channels, etc. In some aspects, insight communications may be API-based. For example, a communications server may be configured to expose API methods or make API method calls that transmit insight values to applications, or as alerts to end users. In other aspects, insight communications may be configured as streaming data using messaging queue logic and streaming protocols and/or patterns. For instance, an insight communications server may be configured as a Kafka® event streaming server, and applications may subscribe to insights via topics. In some aspects, each insight may have a corresponding topic in a streaming environment, and applications may be configured to subscribe to relevant insights via their corresponding topics.

Figure 2A:
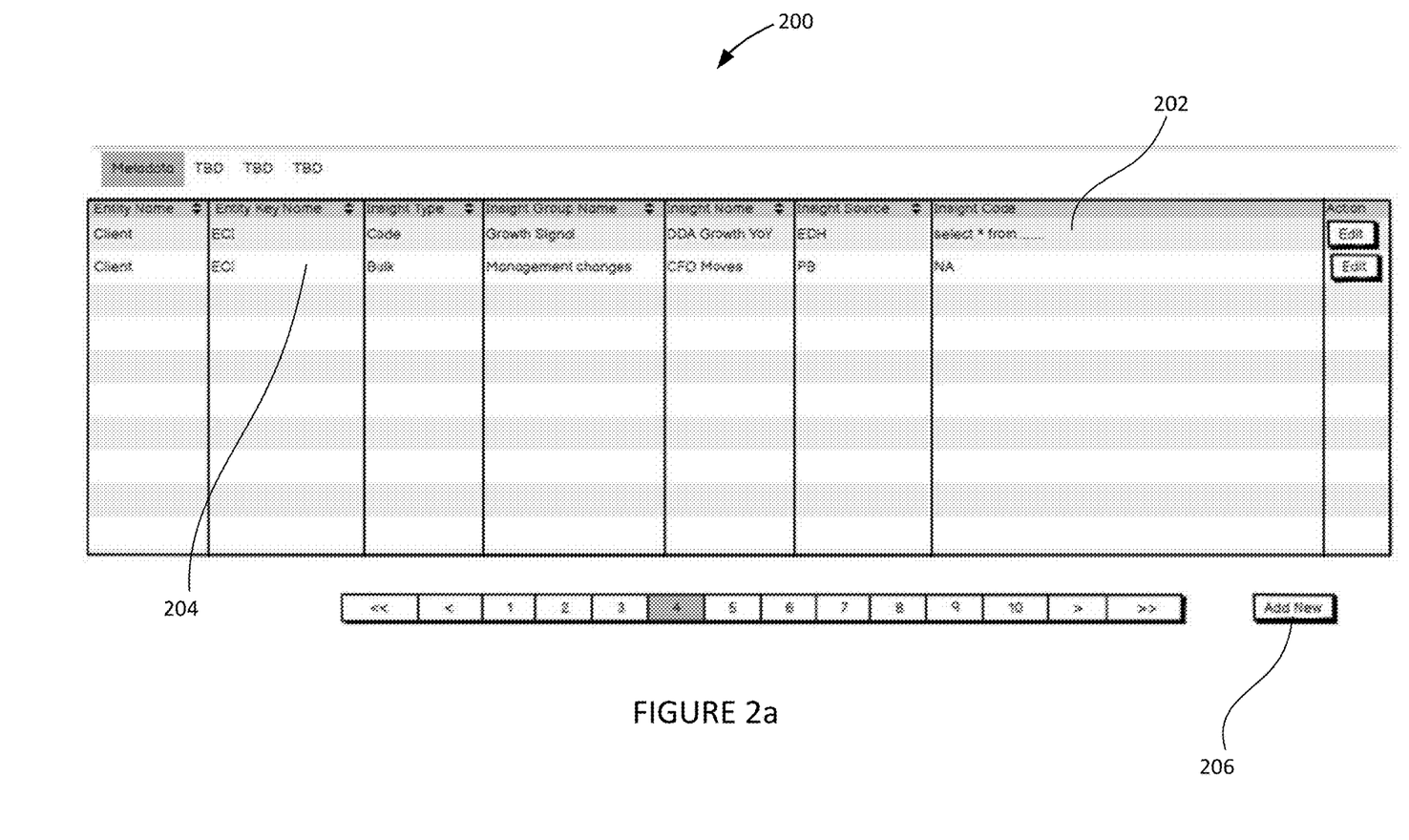
FIG. 2a is a user interface for viewing and configuring an insight for retrieval and storage of an insight in a uniform data model, in accordance with aspects.

FIG. 2a is a user interface for viewing and configuring an insight for retrieval and storage of an insight in a uniform data model, in accordance with aspects. Interface 200 depicts row 202 and row 204. Each of row 202 and row 204 include values in various columns. Each depicted column represents a data field in a target datastore. For instance, row 202 is populated with an entity name "client," and entity key name "ECI," an insight type "Code," an insight group name "Growth Signal," an insight name "DDA Growth YoY," an insight source "EDH," and an insight code which depicts an SQL statement. Likewise, row 204 is populated with an entity name "client," and entity key name "ECI," an insight type "Bulk," an insight group name "Management Changes," an insight name "CFO moves," an insight source "PB," and an insight code "NA". When interface 200 is launched, an appropriate query may be executed against a target datastore, and the results of the query may populate interface 200. Interface 200 further includes add new button 206. Using add new button 206, an end user may define a new insight for retrieval and storage.

Figure 2B:
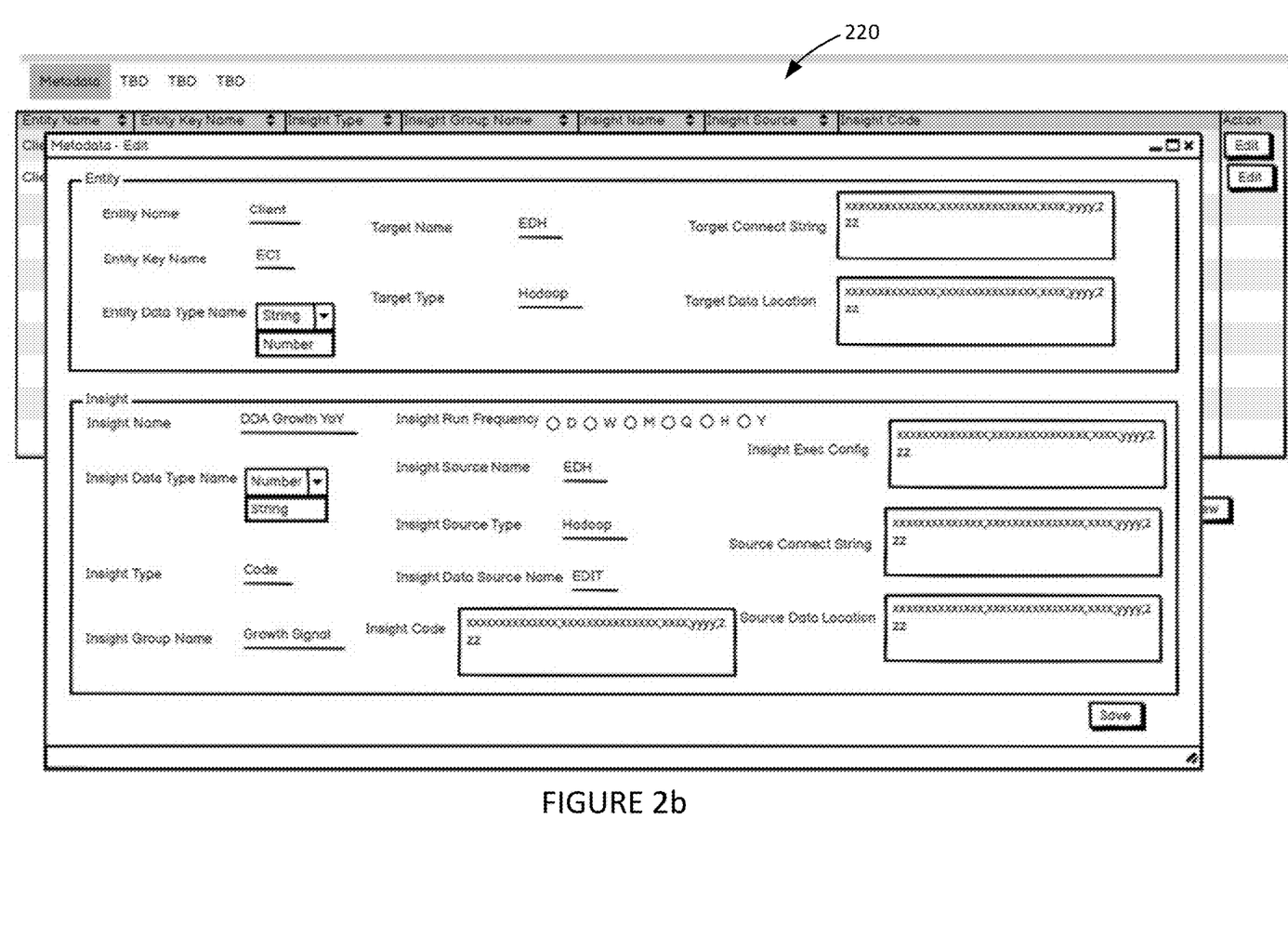
FIG. 2b is a user interface for configuring an insight for retrieval and storage of an insight in a uniform data model, in accordance with aspects.

FIG. 2b is a user interface for configuring an insight for retrieval and storage of an insight in a uniform data model, in accordance with aspects. Upon selecting/activating add new button 206, user interface 220 may be drawn and displayed, user interface 220 may include fillable or selectable data fields for configuring an insight for retrieval and storage in a uniform data model. As shown, user interface 220 may include fields that receive text and format and populate corresponding data fields in a uniform data model. Each field shown in user interface 220 corresponds with a data field in a uniform data model, as described herein.

Figure 3:
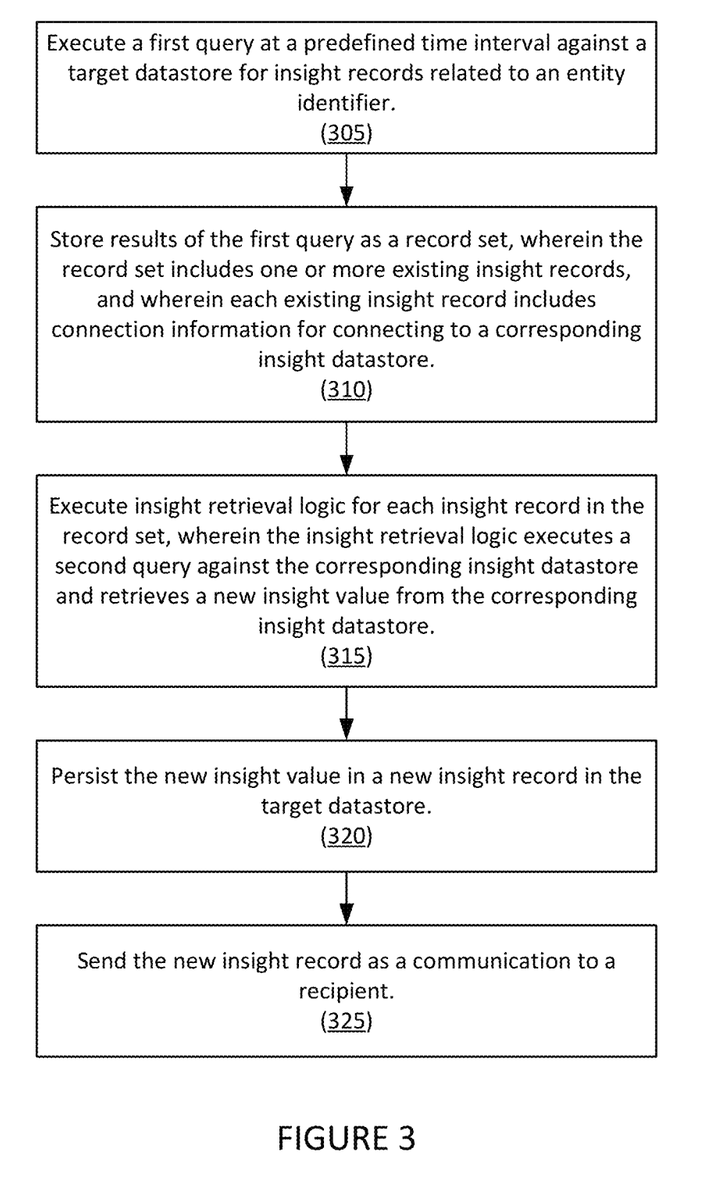
FIG. 3 is a logical flow for normalizing insight data having disparate formats in a uniform data model, in accordance with aspects.

FIG. 3 is a logical flow for normalizing insight data having disparate formats in a uniform data model, in accordance with aspects.

Step 305 includes executing a first query, at a predefined time interval, against a target datastore for insight records related to an entity identifier.

Step 310 includes storing results of the first query as a record set, wherein the record set includes one or more existing insight records, and wherein each existing insight record includes connection information for connecting to a corresponding insight datastore.

Step 315 includes executing insight retrieval logic for each insight record in the record set, wherein the insight retrieval logic executes a second query against the corresponding insight datastore and retrieves a new insight value from the corresponding insight datastore.

Step 320 includes persisting the new insight value in a new insight record in the target datastore.

Step 325 includes sending the new insight record as a communication to a recipient.

Figure 4:
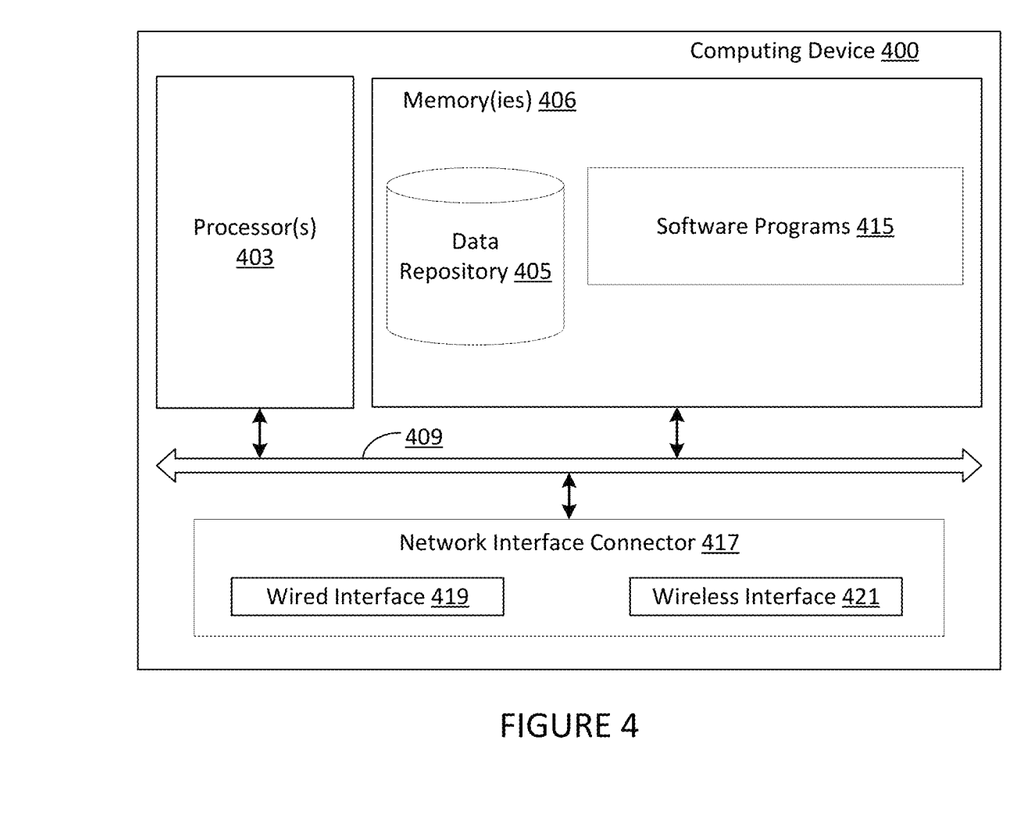
FIG. 4 is a block diagram of a computing device for implementing certain aspects of the present disclosure.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such as an insight retrieval logic engine, a machine learning engine, a communications server, a datastore and database servers, and computer applications may include, and/or execute on, components and configurations like, or similar to, computing device 400. Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor and/or in the form of statically or dynamically programmed electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method, comprising:
   executing a first query, at a predefined time interval, against a target datastore for insight records, the first query including an entity identifier, an insight type, and an insight version;
   storing results of the first query as a record set, wherein the record set includes one or more existing insight records, and wherein each existing insight record includes connection information for connecting to a corresponding insight datastore;
   executing insight retrieval logic for each insight record in the record set, wherein the insight retrieval logic executes a second query against the corresponding insight datastore and retrieves a new insight value from the corresponding insight datastore, wherein the new insight value is input into a field for each insight record;
   persisting the new insight value in a new insight record in the target datastore;
   executing a loop iteratively for each new insight value returned including using an insight connection string stored in the record set and associated with the field to connect to an entity data source;
   merging each new insight value produced for an insight name and updating the field with a merged insight value;
   persisting the merged insight value in the new insight record in the target datastore and updating the version number; and
   sending the new insight record as a communication to a recipient.

2. The method of claim 1, comprising:
   persisting the new insight record with a new time stamp.

3. The method of claim 2, wherein the one or more existing insight records each include a corresponding time stamp.

4. The method of claim 3, wherein the new insight value was added to the insight datastore after the corresponding time stamp.

5. The method of claim 4, comprising:
   determining the new insight value was added to the insight datastore based on existing insight values an existing insight record, the new insight record, the corresponding time stamp, and the new time stamp.

6. The method of claim 1, comprising:
   providing a user interface for configuration and addition of an initial insight record to the target datastore.

7. The method of claim 6, wherein the user interface receives the entity identifier, and the connection information.

8. The method of claim 1, wherein the recipient is a computer application.

9. A system comprising one or more computers including a processor, wherein the one or more computers are configured to:
  execute a first query, at a predefined time interval, against a target datastore for insight records related to an entity identifier, the first query including an entity identifier, an insight type, and an insight version;
  store results of the first query as a record set, wherein the record set includes one or more existing insight records, and wherein each existing insight record includes connection information for connecting to a corresponding insight datastore;
  execute insight retrieval logic for each insight record in the record set, wherein the insight retrieval logic executes a second query against the corresponding insight datastore and retrieves a new insight value from the corresponding insight datastore, wherein the new insight value is input into a field for each insight record;
  persist the new insight value in a new insight record in the target datastore;
  executing a loop iteratively for each new insight value returned including using an insight connection string stored in the record set and associated with the field to connect to an entity data source;
  merging each new insight value produced for an insight name and updating the field with a merged insight value;
  persisting the merged insight value in the new insight record in the target datastore; and
  send the new insight record as a communication to a recipient.

10. The system of claim 9, wherein the one or more computers are configured to:
  persist the new insight record with a new time stamp.

11. The system of claim 10, wherein the one or more existing insight records each include a corresponding time stamp.

12. The system of claim 11, wherein the new insight value was added to the insight datastore after the corresponding time stamp.

13. The system of claim 12, wherein the one or more computers are configured to:
  determine the new insight value was added to the insight datastore based on existing insight values an existing insight record, the new insight record, the corresponding time stamp, and the new time stamp.

14. The system of claim 9, wherein the one or more computers are configured to:
  provide a user interface for configuration and addition of an initial insight record to the target datastore.

15. The system of claim 14, wherein the user interface receives the entity identifier, and the connection information.

16. The system of claim 9, wherein the recipient is a computer application.

17. A non-transitory computer readable storage medium including instructions stored thereon, which instructions, when read and executed by one or more computer processors, cause the one or more computer processors to perform steps comprising:
  executing a first query, at a predefined time interval, against a target datastore for insight records, the first query including an entity identifier, an insight type, and an insight version;
  storing results of the first query as a record set, wherein the record set includes one or more existing insight records, and wherein each existing insight record includes connection information for connecting to a corresponding insight datastore, wherein one of the one or more existing insight records includes an insight configuration setting;
  executing insight retrieval logic for each insight record in the record set, wherein the insight retrieval logic executes a second query against the corresponding insight datastore and retrieves a new insight value from the corresponding insight datastore, wherein the new insight value is input into a field for each insight record, wherein the insight retrieval logic includes using the insight configuration setting to execute an insight run configuration on the corresponding insight datastore;
  persisting the new insight value in a new insight record in the target datastore;
  executing a loop iteratively for each new insight value returned including using an insight connection string stored in the record set and associated with the field to connect to an entity data source;
  merging each new insight value produced for an insight name and updating the field with a merged insight value;
  persisting the merged insight value in the new insight record in the target datastore; and
  sending the new insight record as a communication to a recipient.

18. The non-transitory computer readable storage medium of claim 17, wherein:
  each persisting record include a corresponding time stamp.

19. The non-transitory computer readable storage medium of claim 18, comprising:
  determining the new insight value was added to the insight datastore based on existing insight values an existing insight record, the new insight record, the corresponding time stamp, and the new time stamp; and
  providing a user interface for configuration and addition of an initial insight record to the target datastore; and
  wherein the user interface receives the entity identifier, and the connection information, and wherein the recipient is a computer application.

* * * * *